Nov. 11, 1958   R. H. JOSEPHSON   2,859,986
FLUID PRESSURE RESPONSIVE SEAL
Filed July 27, 1954
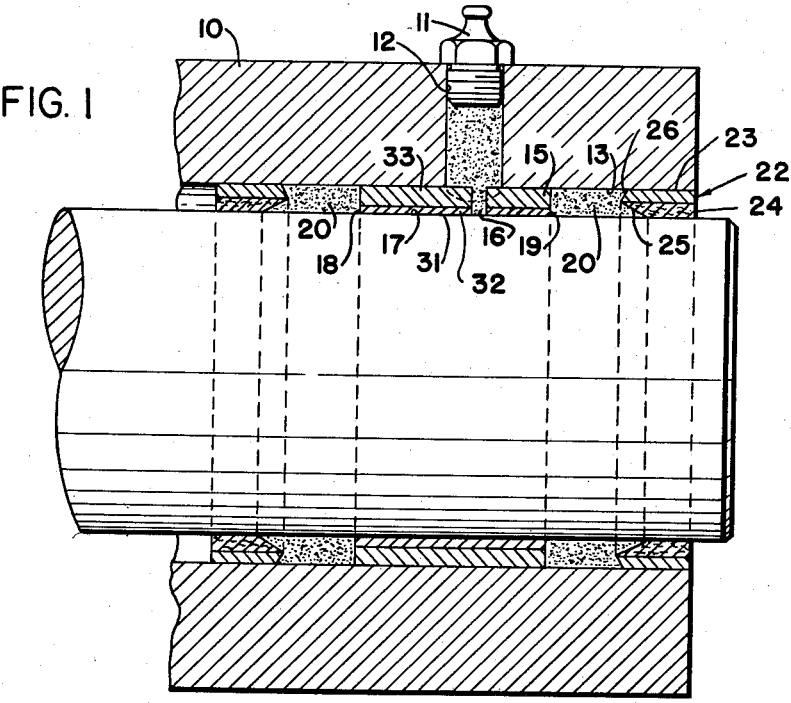
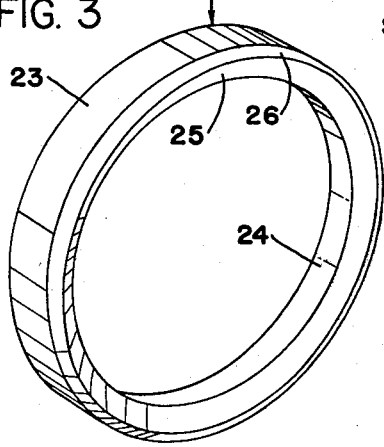
INVENTOR.
ROBERT H. JOSEPHSON

United States Patent Office 2,859,986
Patented Nov. 11, 1958

2,859,986

FLUID PRESSURE RESPONSIVE SEAL

Robert H. Josephson, Cleveland Heights, Ohio, assignor to Clevite Corporation, Cleveland, Ohio, a corporation of Ohio Application July 27, 1954, Serial No. 445,949

3 Claims. (Cl. 286—7)

This invention, relating as indicated to a seal, is particularly directed to a chamfered seal for a combined bearing and lubrication unit, said seal being of simplified construction and of substantially reduced radial thickness. The seal is particularly adapted for lubrication units where a separate seal housing is not desired or cannot be readily provided.

The seal basically consists of a thin and resilient liner member having at least as great an axial length as radial thickness and preferably 2 to 8 times the radial thickness. Said resilient member may be of "texon," i. e. plastic impregnated alpha cellulose, or a plastic alone, or possibly rawhide, or elastomer, or combination of these. This seal may be combined as a single unit with a bearing or may be in a housing having a bearing inserted therein or some combination of these components. At the present time there are a number of lip type lubricant seals with various support means therefor of rubber, rawhide or other materials, including plastics and the like, but in general these components are of considerable radial thickness relative to the shaft and, in order to be flexible, of greater radial thickness than axial width.

In most of these installations there are independent lubrication systems to which lubricant is applied periodically, perhaps with a grease type lubricant, until such time as grease may be seen coming out of the seal. In this invention, this is a simplified type of seal for a combined bearing and lubrication unit where it is undesirable or too expensive to have a separate seal housing to retain the seal in position. Therefore, the seal must have means for retaining itself in the housing. With very thin liners, sleeve bearings, or bushings in a housing, there frequently is not sufficient mechanical flexibility to permit the grease to pass the seal.

Consequently, it will be seen that with hand or powered lubrication equipment employing grease, pressures may be developed as high as 8,000 p. s. i. With separate retainers to hold the seals in place, these will not blow out of the bearing housing. However, with sleeve bearings or bushings in very thin layers, when no separate retainer or seal housing can be provided, these seals must be retained within the bearing housing by the forces acting upon the seals. Since the end-wise axial pressure on these seals is quite high, even though acting over a small area, the seals must be firmly held or seated within the bearing housing. By causing a chamfer to be made on the internal surface of the seal, the pressure of the lubricant on this chamfer will cause a seating force against the bearing housing to hold it in position. Inherent in this construction is the reduced thickness of the installation because of the endwise pressure which forces the seal from the housing. This invention then contemplates a chamfered internal surface for the seal together with an external chamfer on the external surface of the seal if that is desired, but in any event a greater length of axial chamfer on the internal surface than on the external surface by perhaps a factor of 2 to 1 or 5 to 1. The seal in all instances is thin and flexible, less than ⅛" in thickness and preferably ¹⁄₃₂ or ¹⁄₁₆" and having an axial length of 2 to 8 times this thickness.

By chamfer, it is meant that equivalent relief may be employed such as by a rounded corner. These chamfer measurements are considered axially of the seal or shaft they are sealing. This combination of features prevents the seal from blowing out even though there may be no retaining means or member therefor.

An object of this invention is to produce a seal of reduced size for a combined bearing and lubrication unit, employing a chamfer on the lubricant side of said seal to provide a seating force in the absence of retaining means.

A further object of this invention is to provide a resilient material for a seal of radial thickness less than ⅛ of an inch and of greater axial length than its radial thickness, said seal being backed by a strong backing material that may have chamfer on the external surface adjacent to the lubricant.

To the accomplishment of the foregoing and related ends said invention then consists of the means hereinafter fully described in one particular modification, said means being particularly pointed out in the claims, the following description of the chamfered seal setting forth in detail one approved method of carrying out this invention in a seal, such disclosed method, however, constituting but one of the various ways in which the principles of the invention may be used.

In the drawings:

Figure 1 is a cross-sectional view through a bearing and lubrication unit employing this seal.

Figure 2 is a longitudinal section of the seal, and

Figure 3 is a perspective view of the seal.

In Figure 1, 10 shows a housing member having a lubrication nipple 11, and an opening 12, for access to the central bore shown at 13. Said bore has a bearing member 15, having lubrication openings to the journal surface 16, said surface being shown at 17. The bearing extends from the left side shown at 18, to the right side 19, but may have such seal members incorporated as a part of the bearing. The numeral 20 shows a pocket of lubrication and there is a corresponding pocket on the opposite side. The seal proper is shown at 22.

Said seal 22 consists of a strong backing material, such as steel, brass, bronze, or the like, at 23, said layer being the approximate axial length of the seal and being about .020–.040 inch in thickness. Securely bonded to said seal on said backing member on the internal surface thereof is a resilient member of alpha cellulose, rubber, plastic, or the like, shown at 24.

The resilient member having characteristics of rubber, alpha cellulose and the like, where resiliency is mentioned in the specification and claims, it is meant to include materials having the resiliency of these materials, said member having a radial cross-section in which the axial length is 2 to 8 times the radial thickness. The internal surface of said seal should be chamfered as at 25, on the lubricant end thereof and the length of said chamfer mentioned axially of the shaft shall be sufficient with lubricant under pressure to cause a seating pressure. It is able to counteract any unseating forces and to hold the seal in the bearing housing against the endwise pressure of the lubricant acting over the radial thickness.

It will be seen that it is not absolutely necessary for the sealing material to have a strong backing material, and under some conditions it could be made from an elastomer, plastic, nylon or plastic impregnated alpha cellulose. But in any event, there would be a chamfer on the internal surface of the sealing surface as previously described, and there might be a need for chamfer on the external surface adjacent the lubricant for assembly purposes, and in which event there would be need for increased chamfer on the internal surface.

The external chamfer 26, shown on this seal is important in that with a strong backing material, such as steel, brass, bronze, or the like, it would be difficult to insert the seal in the housing without having some type of lead chamfer on the external surface. However, as explained earlier, this lead chamfer must not be as great as the internal surface chamfer. Seals of this type would be generally split, though, of course, they could be solid. The bearing itself in this invention, as is shown at 31, would have generally two layers, the inner layer 32 of a soft bearing material and the backing material 33 of steel, brass, bronze or the like. Suitable oil grooving, not shown in these views, could be provided, as well as the necessary opening for lubricant to the fitting 11, said opening being shown at 16.

In connection with Figure 2 this shows details of the internal surface chamfer on the seal. In this view the resilient material previously described is shown at 24, the backing material at 23, and the external surface chamfer at 26. The axial length of said internal surface chamfer must be two, or perhaps as many as five times greater than the axial length of said external surface chamfer.

Another important feature of these seals is that they must have a radial thickness less than 1/8" and preferably either 1/16 or 1/32 of an inch. The forces that act upon these seals to hold them in place are important to recognize. If the seal has too great a radial thickness the unseating force on the side or end, adjacent the lubricant, would be too great to hold seals in place. Since this unseating force in general is proportional to the end area times the lubricant pressure and the resisting force is proportional to the coefficient of friction times the chamfer pressure on the area over which it is acting, it will be seen how these components are closely interwoven. The seal must be of critical radial thickness and have an important ratio of axial length to radial thickness. However, with these radial thicknesses sufficient internal surface chamfer may be provided with the materials indicated to hold the seal in place.

Although the present invention has been described in connection with a few preferred embodiments thereof, variations and modifications may be resorted to by those skilled in the art without departing from the principles of the invention. All of these variations and modifications are considered to be in the true spirit and scope of the present invention as disclosed in the foregoing description and defined by the appendant claims.

I claim:
1. An axial seal between two right cylindrically shaped surfaces that rotate with respect to one another, said surfaces having a fluid medium under pressure axially on one side of the seal and under a lesser pressure on the other side, said cylindrical surfaces being in close proximity to one another and spaced apart by a distance less than 1/8" in thickness, said seal being of cylindrical shape of uniform thickness throughout substantially its entire length and having an internal and external diametral surface and comprising a thin layer of resilient material stationary with respect to one of said cylindrical surfaces and in rubbing friction contact with the other cylindrical surface to provide a sealing surface, said seal having on the sealing surface a chamfer on one side of the axial surface of the seal adjacent the fluid under pressure, thereby permitting said fluid to get behind the chamfer and seat the resilient layer of the seal against the other cylindrical surface.

2. The seal of claim 1, in which the chamfer on the sealing surface is on the internal diametral surface and there is a further chamfer on the external diametral surface of the seal, the chamfer on said internal diametral surface being approximately two to five times in axial length the chamfer on the external diametral surface.

3. An axial seal positioned between a journal and a bore, said journal and bore having a radial dimensional difference of less than 1/8", said seal composed of metallic cylinder in intimate contact with the bore and having a cylindrical liner composed of a resilient material bonded to its inner surface and in sealing contact with the journal, said seal being subjected to fluid pressure at one end and having a chamfer formed in its inner surface at the pressure end of an axial length two to five times that of the radial thickness of the seal whereby the pressure will expand the seal outwardly against the bore at the chamfer thus providing friction means to prevent axial movement in the bore as a result of the pressure.

References Cited in the file of this patent
UNITED STATES PATENTS

| | | |
|---|---|---|
| 1,733,416 | Lebesnerois | Oct. 29, 1929 |
| 1,946,106 | Patrick | Feb. 6, 1934 |
| 2,622,449 | Barker | Dec. 23, 1952 |
| 2,651,534 | Kosatka | Sept. 8, 1953 |
| 2,760,802 | Haley | Aug. 28, 1956 |